Aug. 20, 1968   W. B. RICHARDSON, SR   3,397,853
FLUID SUSTAINED VEHICLE
Filed Oct. 5, 1966

INVENTOR
WILLIAM B. RICHARDSON, SR.

Aug. 20, 1968    W. B. RICHARDSON, SR    3,397,853
FLUID SUSTAINED VEHICLE
Filed Oct. 5, 1966    2 Sheets-Sheet 2

INVENTOR
WILLIAM B. RICHARDSON, SR.
BY Harry M. Saragovitz,
Edward J. Kelly, Herbert Berl
& S. Dubroff
ATTORNEYS

United States Patent Office 3,397,853
Patented Aug. 20, 1968

3,397,853
FLUID SUSTAINED VEHICLE
William B. Richardson, Sr., 711 Warrington Ave., East Riverton, N.J. 08077
Filed Oct. 5, 1966, Ser. No. 584,614
9 Claims. (Cl. 244—23)

ABSTRACT OF THE DISCLOSURE

A fluid sustained aircraft in which a fluid diverter has swivelly and axially slidingly controlled motion relative to the main body portion. The diverter can be controlling moved as an operational unit in all directions and can control the velocity of diverted fluid to enable landing of the craft at any desired fluid motor output while allowing for desirous instantaneous craft operational response to adverse landing conditions.

---

The invention described herein may be manufactured and used by or for the Government for governmental purposes without the payment to me of any royalty thereon.

This invention relates to fluid sustained vehicles and, more particularly, to a vertical lift aircraft having an annular air foil or fuselage in which lift or vertical craft motion is obtained basically by the various components of generated air force in an opposed direction upon the leading surface of the fuselage.

It is an object of the invention to provide such a vehicle having simple means for precisely controlling its movements in any desired direction.

Another object is to provide such a vehicle having an improved operating efficiency.

In one aspect of the invention a fluid sustained vehicle has a main body portion from which extends support means, fluid motor means for delivering fluid in a predetermined path past the support means, and fluid diverting means swivelly mounted upon the support means.

These and other objects, advantages and features will become more apparent from the following description and accompanying drawings in which.

While the following description is directed to an aircraft, the principles of the invention are applicable to other forms of fluid sustained vehicles such as water or amphibious vessels.

Figure 1:
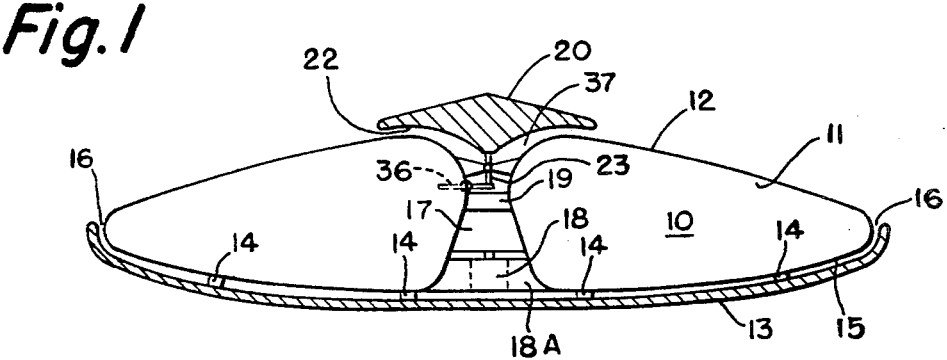
FIG. 1 is an elevation sectional view of a fluid sustained vehicle embodying the principles of the invention.
Figure 2:
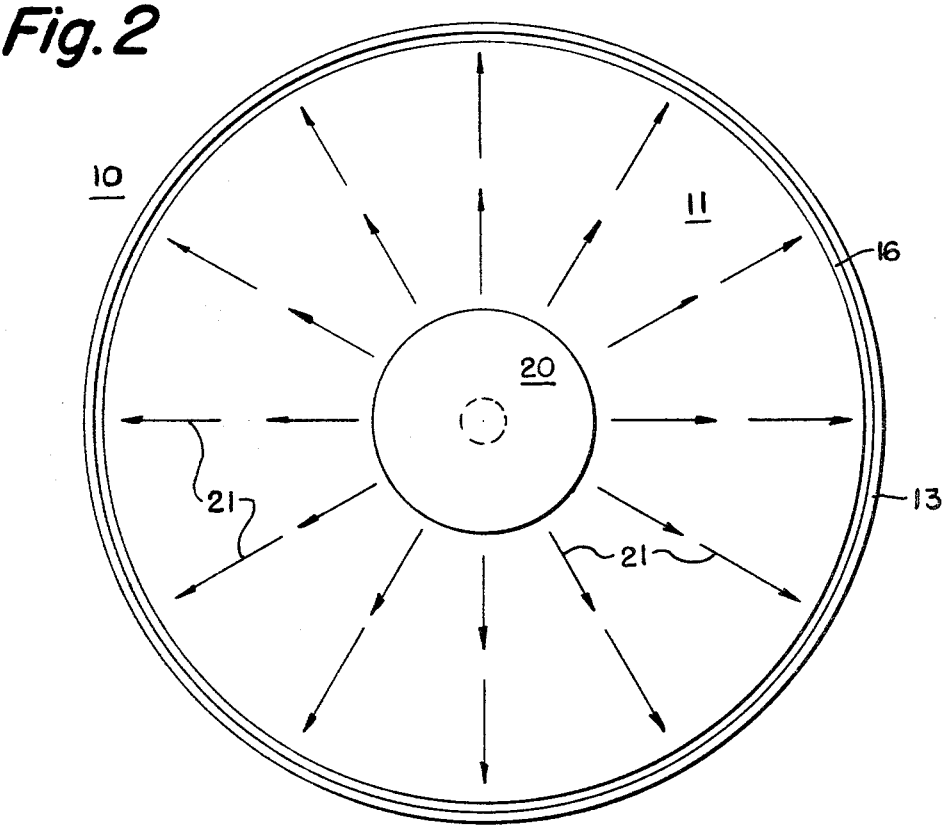
FIG. 2 is a top plan view of the FIG. 1 arrangement.
Figure 3:
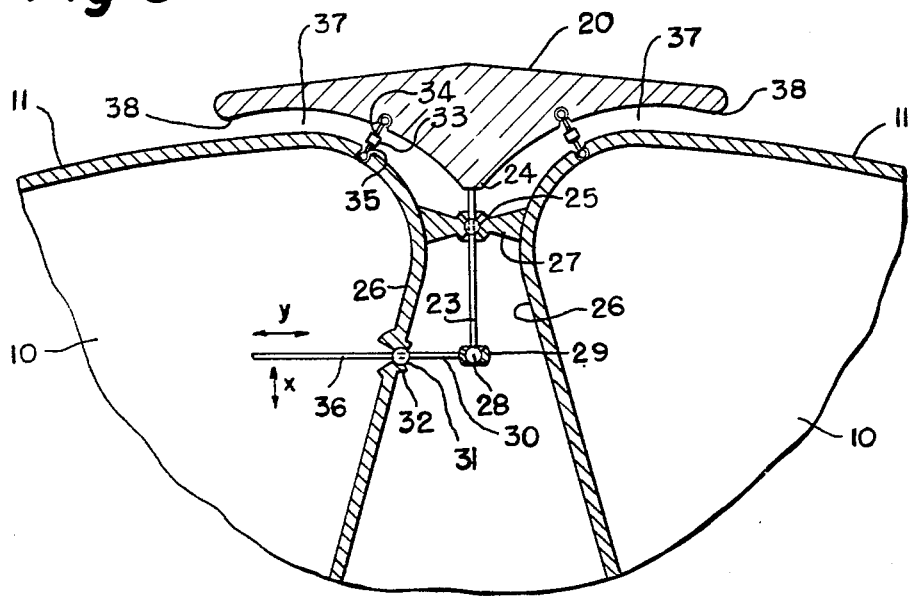
FIG. 3 is an enlarged partial view of the FIG. 1 arrangement.

The annular air foil or fuselage 10 (FIGS. 1, 3) suitable for personnel occupancy is defined by a hollow ring-like shell or frame 11, the upper inclined or sloping outer surface portion 12 of which is capable of receiving a controlled amount of laminated fluid film flow therealong as will become apparent to guide the vehicular movement in a predetermined manner. A lower dish or cup-shaped member 13 extends across the bottom of the vehicle and is spacedly secured thereto by means of appropriate brackets or the like 14 secured to the lower surface 15 of frame 11. Lower cup member 13 extends sufficiently past the outer surfaces of the annular shell 11 such that a predetermined amount of fluid flow may repeatedly enter intake channel 16 as may be drawn inwardly by appropriate fluid motor means, preferably in the form of a compressor or the like 17 suitably connected to a variable speed, reversible motor 18 mounted within its housing 18A in a central portion of the craft, there being sufficient space provided for fluid flow upwardly through the fluid motor arrangement. Immediately above the compressor 17 is an anti-swirl directional chamber 19 through which the fluid passes just before it approaches a fluid diverting member or dome 20 whose under surface 22 is shaped so as to controllingly direct fluid flow outwardly and downwardly along surface 12 in all directions as seen by arrows 21 shown in FIG. 2.

The dome shaft 23 (FIGS. 1, 3) is rigidly secured to the dome 20 at the lower central portion 24 thereof and pivot trunnion or ball 25, slidably receiving shaft 23, is supported centrally of the innermost fuselage peripheral wall 26 (FIGS. 3, 4) in an appropriate spider-like trunnion support 27 extending inwardly from peripherally spaced portions of wall 26. A ball 28 on the lower end of shaft 23 is confined within socket joint 29 of control arm 30, the ball and socket joint permitting a desired limited relative motion between shaft 23 and arm 30.

Control arm 30 extends into a predetermined fuselage cock-pit area through a portion of wall 26 where it is slidably mounted in a pivot trunnion arrangement below the shaft support means 27. Pivot trunnion or ball 31 slidably receives control arm 30 and is appropriately seated for pivotal or swivel movement in trunnion support 32 which is formed or secured in wall 26.

A plurality of retaining units 33 interconnect under surface portions of dome 20 with the main fuselage body portion 11 at pre-determined spaced positions. Each unit 33 has a pair of telescoping link members 34, 35, each of which is correspondingly pivotally connected to the dome 20 or main body 11.

Thus, (1) the handle or free end 36 of control arm 30 may be moved slidingly in and out of trunnion support 32 (as indicated at Y) to merely pivot shaft 23 in its trunnion support 27, such that dome 20 is tilted to the left or right to vary the controlled fluid flow through laterally directed portions of diverter channel 37 and particularly past the exiting edges or surfaces 38 of the dome 20. This would tend to bank or incline the craft to the left or right. (2) The handle 36 may be pivotally moved up and down about a horizontal axis (as indicated at X) to simply raise and lower dome 20 and its slidingly mounted shaft 23 for varying the fluid flow capabilities. (3) Handle 36 may be pivoted horizontally about a vertical axis to provide shaft 23 with a combined sliding and pivotal motion and thus impart a corresponding or similar motion to the dome. (4) Any handle movement embodying two or more of the foregoing motions of handle 36 will enable dome and shaft motion to produce any desired type of combined motion to the dome 20 and shaft 23, within the physical limitations of the apparatus, such that the fluid diverting dome may be moved in all directions for controlling movement of the craft in all directions.

Figure 4:
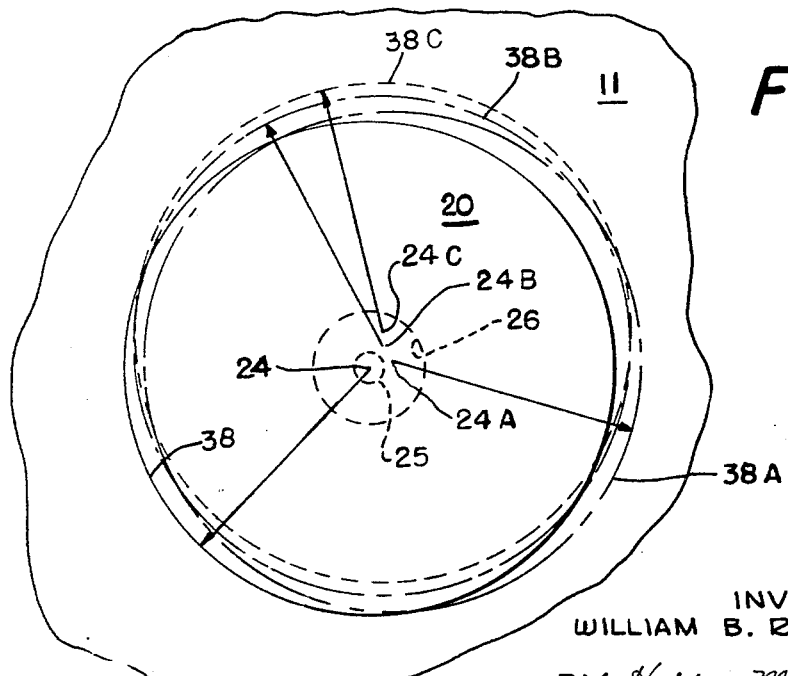
FIG. 4 is a partial top plan view of FIG. 3.

As seen in FIG. 4 the dome exiting edge 38 is positioned with the dome lower central portion 24 assuming a neutral or normal position substantially axially overlying ball 25 and wall 26. Small representative movements of dome portion 24 to points 24A, 24B and 24C will correspondingly move the dome such that exiting edge 38 will assume respective diverter positions indicated at 38A, 38B and 38C.

Various modifications, changes or alterations may be resorted to without departing from the scope of the invention as defined in the appended claims.

I claim:
1. In a fluid sustained vehicle having a main body portion,
   support means extending from said body portion,
   fluid diverting means swivelly and slidably mounted upon said support means,
   fluid motor means for delivering fluid in a predetermined path toward said fluid diverting means, and
   means connected to said fluid diverting means and ex- tending into said body for controlling movement of said fluid diverting means, said controlling means including an arm having one end thereof provided with a socket joint, and a ball mounted in said socket and connected to said fluid diverting means,
so constructed and arranged that said fluid diverting may be moved as a unit in all directions.

2. The arrangement of claim 1 in which said arm is swivelly mounted upon said main body portion.

3. The structure of claim 1 in which said arm is swivelly and slidably mounted upon said main body portion.

4. The arrangement in accordance with claim 3 wherein a plurality of retaining means interconnect said fluid diverting means with said main body portion.

5. The structure of claim 4 wherein each of said retaining means comprises a linkage having two telescoping members each of which is pivotally connected to respective ones of said fluid diverting means and said main body portion.

6. In a fluid sustained vehicle having a main body portion,
fluid diverting means overlying at least a portion of said main body portion,
means including a fluid motor for delivering fluid in a predetermined path toward said fluid diverting means, and
means for swivelly and axially slidingly controlling movement of said fluid diverting means relative to said main body portion,
so constructed and arranged that said fluid diverting means may be controllingly moved as an operational unit in all directions.

7. The structure in accordance with claim 6 wherein a support extends from said main body portion, and said controlling means includes a ball journalled in said support and a shaft slidably mounted in said ball and connected to said fluid diverting means.

8. The structure of claim 7 wherein said controlling means includes an arm swivelly mounted upon said main body portion and connected to said shaft.

9. The structure of claim 6 in which said controlling means includes an arm swivelly mounted upon said body portion and connected to said fluid diverting means.

References Cited
UNITED STATES PATENTS

| | | | |
|---|---|---|---|
| 2,921,435 | 1/1960 | Landraf | 239—265.19 |
| 2,936,582 | 5/1960 | Davidson | 244—73 |
| 2,953,320 | 9/1960 | Parry | 244—12 |
| 3,019,991 | 2/1962 | Hruby | 239—521 X |
| 3,034,747 | 5/1962 | Lent | 244—73 X |
| 3,302,885 | 2/1967 | Herbert | 239—265.19 |

MILTON BUCHLER, *Primary Examiner.*

T. W. BUCKMAN, *Assistant Examiner.*